Sept. 4, 1934.  F. GOSSLAU  1,972,441
INTERNAL COMBUSTION ENGINE ELECTRIC GENERATING SET
Filed May 6, 1933
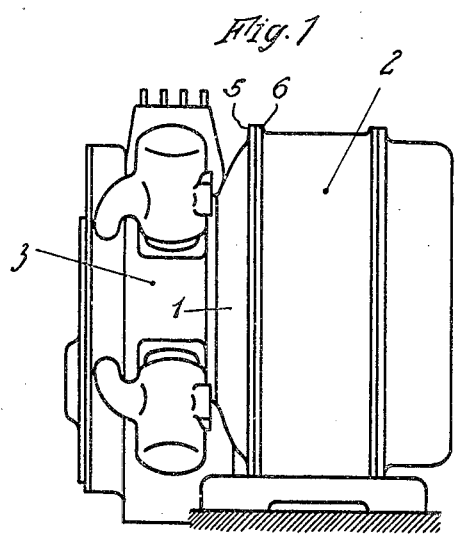
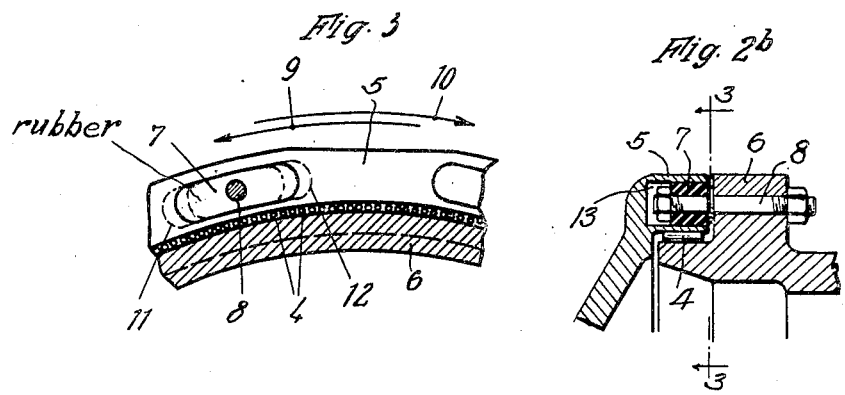
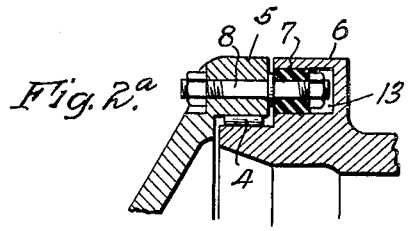

Patented Sept. 4, 1934

1,972,441

UNITED STATES PATENT OFFICE 1,972,441

INTERNAL COMBUSTION ENGINE ELECTRIC GENERATING SET

Fritz Gosslau, Berlin-Charlottenburg, Germany, assignor to Siemens & Halske, Aktiengesellschaft, Siemensstadt, near Berlin, Germany, a corporation of Germany Application May 6, 1933, Serial No. 669,623
In Germany July 11, 1932

4 Claims. (Cl. 290—1)

My invention relates to improvements in internal combustion engine electric generating sets.

It is well known to those skilled in the art to drive electric machines by means of internal combustion engines. Further, it has already been proposed to employ the frame or casing of the electric machine itself as support for the internal combustion engine. In internal combustion engines torsional oscillations occur as a result of the power transmitted to the crank shaft during the successive working strokes. In the case of engines with parallel cylinders in straight alignment in addition to the above oscillations other stresses are present which result from the transmission of the cylinder power to the various cranks of the crank shaft. The transmission of such oscillations and stresses to the electric machine must be prevented. To this end, couplings for drives have hitherto been provided between the crank shaft and the electric machine shaft. This arrangement has, however, the drawback that the common shaft of the two units must be divided and that only damping members of limited dimensions can be located in the coupling.

The object of the present invention is to avoid in radial cylinder internal combustion engine electric generating sets the arrangement of a coupling between the shafts of the internal combustion engine and the electric machine and yet to prevent the transmission of oscillations of the crank shaft to the driven machine. This is accomplished according to the invention by mounting the prime mover in such a manner with relation to the electric machine by the use of resilient damping members concentrically arranged with respect to the crank shaft axis as to permit the prime mover casing to peripherally oscillate about a normal central position.

By this arrangement it is possible to design the shaft for the internal combustion engine and the electric machine as one piece. Moreover, owing to a greater peripheral length being available a sufficient number of damping members may be inserted concentrically to the crank shaft so as to attain a flexibility of the desired degree. Furthermore, the individual damping members may be replaced during the operation.

In the accompanying drawing an embodiment of my invention is illustrated in a diagrammatic form.

Fig. 1 shows a side elevational view of an internal combustion engine associated with an electric generator;

Figs. 2ª and 2ᵇ show enlarged fragmental transverse sectional views through the flanges 5 and 6 in Fig. 1, and Fig. 3 shows a section taken between the flanges 5 and 6 on line 3—3 in Fig. 2ᵇ.

The casing 1 of the radial cylinder internal combustion engine 3 is by means of its flange 5 mounted rotatably on a flange 6 of the generator 2 by means of rollers 4 shown in Figs. 2ª, 2ᵇ and 3. In order to limit the rotation of the prime mover casing, elastic intermediate members 7 are inserted into correspondingly shaped recesses 13 provided in the face of one of the flanges 5 or 6. In Fig. 2ª these elastic members are shown as being located within flange 6, and in Fig. 2ᵇ they are located in the prime mover flange 5. In each case each elastic member is secured to the opposite flange by means of a bolt 8. Should certain stresses occur during the operation of the internal combustion engine in the direction of the arrows 9 or 10 in Fig. 3, the casing of the internal combustion engine may be shifted to the position 11 or 12 as shown in dotted lines, depending upon the direction in which the stresses are exerted, thereby compensating for the pulsating load.

The prime mover casing cannot slide off the generator casing, because generator armatures, as is well-known, are not only limited by their bearings in their movements in axial direction, but also during the operation the magnetic field pull of the generator holds the armature axially in place. These means are sufficient to prevent the engine casing from sliding off flange 6.

I claim as my invention:—

1. In a radial internal combustion engine-electric generator set, an engine casing and a generator casing coupled together so that one serves as a support for the other, resilient damping members arranged concentrically to the crank shaft axis between the coupled parts of said two casings, said members being so mounted as to permit the engine casing to oscillate with respect to the generator casing about a central position.

2. In a radial internal combustion engine-electric generator set, an engine casing and a generator casing, each having a flange, the generator flange engaging the engine casing flange and being arranged to thereby movably support the engine casing, resilient damping members arranged concentrically to the crank shaft axis between said flanges, said members being fixed to one of said flanges and engaging the other flange so as to couple the engine casing in peripheral direction with the generator casing, and to permit the engine casing to oscillate peripherally with respect to the generator casing about a central position.

3. In a radial internal combustion engine-electric generator set, a generator casing and an engine casing rotatably coupled to said generator casing and supported by the latter, resilient damping members arranged concentrically to the crank shaft axis between the two casings, bolts for securing said members to said engine casing, and recesses provided in the generator casing for respectively receiving said members, whereby the engine casing is permitted to oscillate peripherally with respect to the generator casing about a central position.

4. In a radial internal combustion engine-electric generator set, a generator casing and an engine casing rotatably coupled to the generator casing and supported by the latter, resilient damping members arranged concentrically to the crank shaft axis between the two casings, bolts for securing said members to said generator casing, and recesses provided in the engine casing for respectively receiving said members, whereby the engine casing is permitted to oscillate peripherally with respect to the generator casing about a central position.

FRITZ GOSSLAU.